(12) United States Patent
Moloney (10) Patent No.: US 8,523,724 B2
(45) Date of Patent: Sep. 3, 2013

(54) METHOD OF SYNCHRONIZING IN SPLIT TORQUE CONTINUOUSLY VARIABLE DUAL CLUTCH TRANSMISSION

(75) Inventor: Kevin Moloney, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 236 days.

(21) Appl. No.: 12/953,936

(22) Filed: Nov. 24, 2010

(65) Prior Publication Data

US 2012/0125730 A1 May 24, 2012

(51) Int. Cl.
*F16H 47/04* (2006.01)

(52) U.S. Cl.
USPC .......................................................... 475/83

(58) Field of Classification Search
USPC ...................................................... 74/730.1
See application file for complete search history.

(56) References Cited

U.S. PATENT DOCUMENTS

| 4,663,714 | A | * | 5/1987 | Cornell et al. | 701/52 |
| 4,983,149 | A | * | 1/1991 | Kita | 475/76 |
| 5,052,986 | A | * | 10/1991 | Jarchow et al. | 475/76 |
| 5,403,241 | A | * | 4/1995 | Jarchow et al. | 475/72 |
| 5,522,775 | A | | 6/1996 | Maruyama et al. | |
| 6,190,280 | B1 | | 2/2001 | Horsch | |
| 6,909,955 | B2 | | 6/2005 | Vukovich et al. | |
| 7,004,884 | B2 | | 2/2006 | Cho | |
| 7,063,638 | B2 | | 6/2006 | Weeramantry | |
| 7,354,368 | B2 | | 4/2008 | Pollman | |
| 7,530,913 | B2 | * | 5/2009 | Fabry et al. | 475/82 |
| 7,530,914 | B2 | * | 5/2009 | Fabry et al. | 475/82 |
| 7,549,946 | B2 | | 6/2009 | Ayabe et al. | |
| 7,740,557 | B2 | | 6/2010 | Kondo et al. | |
| 2009/0036248 | A1 | | 2/2009 | Mueller et al. | |
| 2010/0035722 | A1 | | 2/2010 | Long et al. | |
| 2010/0105517 | A1 | | 4/2010 | Borntraeger | |
| 2010/0151991 | A1 | | 6/2010 | Mair et al. | |
| 2010/0184561 | A1 | | 7/2010 | Schaarschmidt et al. | |

FOREIGN PATENT DOCUMENTS

DE 19621201 11/1997
EP 1541898 6/2005

* cited by examiner

*Primary Examiner* — Dirk Wright
(74) *Attorney, Agent, or Firm* — Leydig, Voit & Mayer (57) ABSTRACT

A method including activating a first clutch assembly to connect a first rotatable member to a rotating final output member until a shift trigger point is reached to provide a rotational speed to the first rotatable member from the final output member. The first clutch assembly is then deactivated. The second clutch assembly that connected a synchronized second rotatable member with the final output member is then deactivated. A third synchronizer engaged with the first rotatable member, and the first clutch assembly is activated to connect the first rotatable member to the final output member.

20 Claims, 8 Drawing Sheets

METHOD OF SYNCHRONIZING IN SPLIT TORQUE CONTINUOUSLY VARIABLE DUAL CLUTCH TRANSMISSION

TECHNICAL FIELD

This disclosure relates generally to continuously variable transmissions and more particularly to a method of synchronizing components in a dual clutch hydromechanical transmission.

BACKGROUND

Multi-range hydromechanical transmissions are well known. Ranges are changed by sequentially disengaging and engaging a number of synchronizers and clutch assemblies. Split torque continuously variable transmissions (CVT) may utilize automated dual clutch arrangements in conjunction with a plurality of synchronizers. For example, U.S. Pat. No. 7,530,913 to Fabry, et al., which is assigned to the assignee of this disclosure, discloses a multirange hydromechanical transmission that includes two clutch assemblies and three synchronizers. All synchronizers are susceptible to damage during the synchronization process if the relative speed at the start of the synchronization process is too great.

The disclosed method of synchronizing in a split torque continuously variable transmission is directed to overcoming one or more of the problems set forth above.

SUMMARY

The disclosure describes, in one aspect, a method of selectively engaging one of a synchronizer and activating one of a clutch of a continuously variable transmission. The transmission includes an output shaft assembly having a plurality of output members, first and second clutch assemblies, second and third synchronizers, and first and second rotatable members. The method comprising the steps of providing first and second power source paths; outputting a combined power of the first and second power source paths through at least one of the output members of the output shaft assembly; engaging the second synchronizer to synchronize a speed of the second rotatable member to one of the output members of the output shaft assembly; activating the second clutch to connect the synchronized second rotatable member to a final output member to output a second speed having a second gear ratio; activating the first clutch assembly to connect the first rotatable member to the final output member to provide a rotational speed to the first rotatable member; maintaining connection of the first rotatable member with the final output member until a shift trigger point is reached; deactivating the first clutch assembly; deactivating the second clutch assembly; engaging the third synchronizer to synchronize the first rotatable member to the one of the output members of the output shaft assembly; and activating the first clutch assembly to connect the synchronized first rotatable member to the final output member to output a third speed having a third gear ratio.

The disclosure describes, in another aspect, a method of selectively engaging one of a synchronizer and activating one of a clutch assembly of a hydromechanical transmission. The method comprises the steps of: providing first and second power source paths; outputting a combined power of the first and second power source paths through an output shaft assembly including a plurality of output members; engaging a first synchronizer to synchronize a speed of a first rotatable member to one of the plurality of output members of the output shaft assembly; activating a first clutch assembly to connect the synchronized first rotatable member to a final output member to place the transmission in a forward gear and output a first speed having a first gear ratio; engaging a second synchronizer to synchronize a second rotatable member to another of the plurality of output members of the output shaft assembly; deactivating the first clutch assembly; activating a second clutch assembly to connect the synchronized second rotatable member to the final output member to place the transmission in a high forward gear range and output a second speed having a second gear ratio; neutralizing the first synchronizer; activating the first clutch assembly to connect the first rotatable member to the final output member to provide a rotational speed to the first rotatable member; maintaining connection of the first rotatable member with the final output member until a shift trigger point is reached; deactivating the first clutch assembly; deactivating the second clutch assembly; adjusting an output speed of at least one of the first or second power source paths to minimize a difference in speed between the another of the plurality of output members of the output shaft assembly and the first rotatable member; engaging a third synchronizer to synchronize the speed of the first rotatable member with the another of the plurality of output members of the output shaft assembly; and activating the first clutch assembly to connect the first rotatable member synchronized using the third synchronizer to the final output member to place the transmission in an auxiliary gear range to output a third speed having a third gear ratio.

The disclosure describes, in yet another aspect, a method of selectively engaging one of a synchronizer and activating one of a clutch assembly of a hydromechanical transmission. The method comprises the steps of: providing first and second power source paths; outputting a combined power of the first and second power source paths through a output shaft assembly having a plurality of output members; engaging a first synchronizer to synchronize a first rotatable member with a speed of one of the multiple output members of the output shaft assembly; activating a first clutch assembly to connect the synchronized first rotatable member to a final output member to output a first speed having a first gear ratio; engaging a second synchronizer to synchronize a second rotatable member with the speed of another of the multiple output members of the output shaft assembly; deactivating the first clutch assembly; activating a second clutch assembly to connect the synchronized second rotatable member to the final output member to output a second speed having a second gear ratio; neutralizing the first synchronizer; activating the first clutch assembly to connect the first rotatable member to the final output member to provide a rotational speed to the first rotatable member; maintaining connection of the first rotatable member with the final output member until a shift trigger point is reached; deactivating the first clutch assembly; deactivating the second clutch assembly; engaging a third synchronizer to synchronize the first rotatable member with the another of the multiple output members of the output shaft assembly; and activating the first clutch assembly to connect the first rotatable member synchronized using the third synchronizer to the final output member to output a third speed having a third gear ratio.

BRIEF DESCRIPTION OF THE DRAWING(S)

The accompanying drawings, which are incorporated in and constitute a part of this specification, illustrate exemplary embodiments of the disclosure and, together with the description, serve to explain the principles of the disclosure. In the drawings.

DETAILED DESCRIPTION

This disclosure relates to a method of synchronizing in a split torque arrangement in a continuously variable transmission. The method has universal applicability to any machine utilizing such an arrangement. For example, the term "machine" may refer to any machine that performs some type of operation associated with an industry such as, for example, mining, construction, farming, transportation, or any other industry known in the art. By way of example only, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other paving or underground mining equipment. Moreover, one or more implements may be connected to the machine and driven from the transmission.

Figure 1:
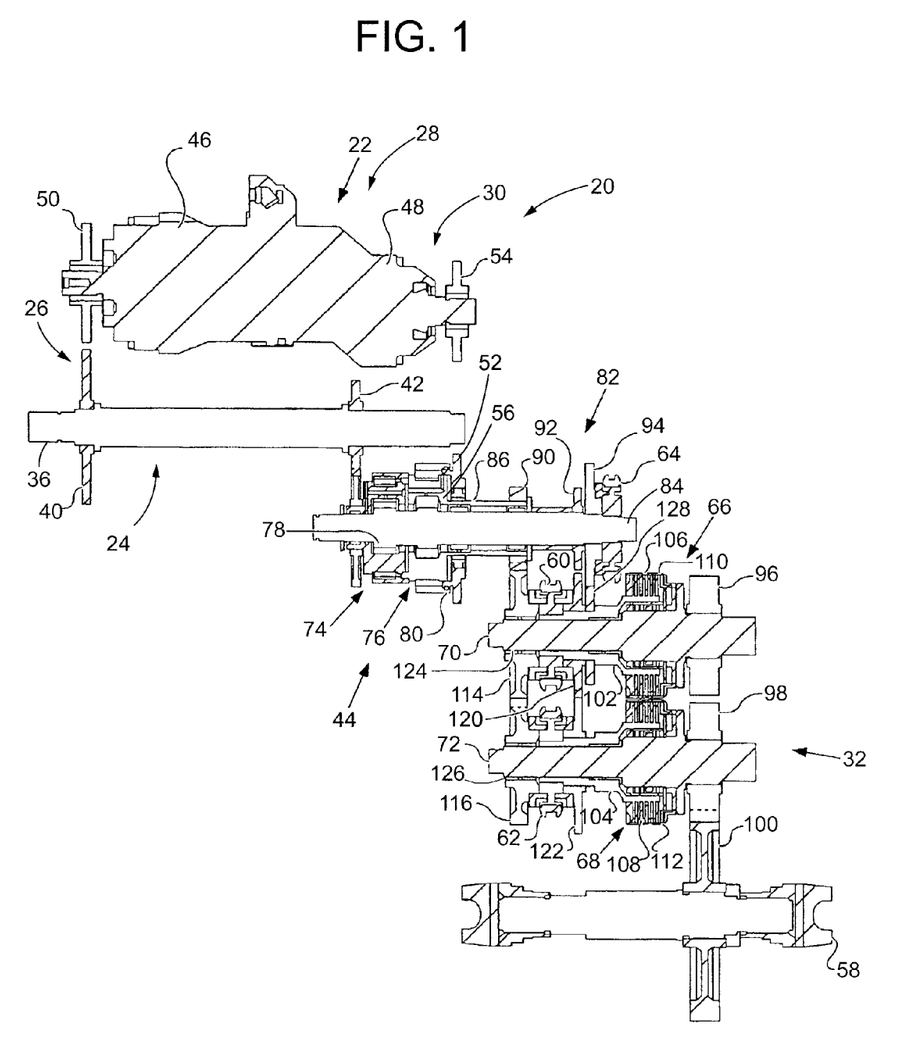
FIG. 1 illustrates a sectional view of a hydromechanical dual clutch transmission.

Referring to FIG. 1, there is illustrated a cross-sectional view of an exemplary continuously variable transmission 20 with which the method may be utilized. While a specific embodiment of a continuously variable transmission 20 is described herein, the continuously variable transmission may be of any type having appropriate components for performance of the method disclosed herein. The disclosed arrangement includes first and second power source paths 22, 24. For example, the continuously variable transmission 20 may be a hydromechanical transmission 26 including a hydrostatic transmission 30, and a mechanical transmission 32 comprising a split torque power path through a planetary output shaft assembly 82 with multiple planetary outputs into mechanical a dual clutch transmission 32.

While this disclosure explains a hydromechanical transmission 26 in detail, any appropriate alternate arrangement may be utilized. By way of example and not limitation, the hydrostatic transmission 30 may be embodied as an alternate power source path, such as, for example, an electric motor driving an electro-mechanical transmission (not shown), an electric battery and a motor (not shown), a hydraulic accumulator and a motor (not shown), an electric generator and electric motor (not shown), or other device capable of providing input power, without departing from the scope of the present disclosure.

An engine 34 (see FIG. 2) drives the hydromechanical transmission 26. The engine 34 may be, for example, an internal combustion engine, although the engine 34 may be any kind of device capable of powering the continuously variable transmission 20 as described herein. The engine 34 outputs to both the hydrostatic transmission 30 and the mechanical transmission 32 through an input member 36. The input member 36 provides split power to the hydrostatic transmission 30 and a planetary arrangement 44 of the mechanical transmission 32 through first and second fixed input gears 40, 42, respectively. The planetary arrangement 44 then provides outputs to the mechanical transmission 32 through the planetary output shaft assembly 82, as explained in greater detail below.

The term "fixed" may be understood as being integral with, permanently attached, pinned, interconnected through a splined connection, or fused by welding, for example, or by any other means known to those having ordinary skill in the art.

The hydrostatic transmission 30 includes a variator 28 that includes a variable displacement pump 46 and a motor 48, which is operated by the pump 46. The variable displacement pump is drivingly connected to the engine 34, through a hydrostatic transmission input gear 50 engaged with the first fixed input gear 40. The motor 48 may be variable displacement or fixed displacement. The motor 48 outputs through a hydrostatic transmission output gear 54 to a second planetary input member 52 to the planetary arrangement 44. Thus, the pump 46 of the hydrostatic transmission 30 uses the split input power from the engine 34 to fluidly drive a motor 48 to convert the input power from the engine 34 to hydrostatic output power over a continuously variable speed ratio.

The hydromechanical transmission 26 includes a second fixed input gear 42 coupled to the input member 36, the second fixed input gear 42 providing input to the planetary arrangement 44 by way of a carrier 56. The planetary arrangement 44 combines the hydrostatic output power from the first power source path 22 to second planetary input member 52 with the split input mechanical power from second power source path 24 by way of the second fixed input gear 42 to provide hydromechanical output power to mechanical transmission 32 through the planetary output shaft assembly 82 including multiple planetary output members such as internal shaft 84 and aligned sleeve 86. In other words, the planetary arrangement 44 provides a choice of planetary outputs to the mechanical transmission 32 including a final output member 58 by way of a plurality of gears (explained in greater detail below), synchronizing assemblies or synchronizers 60, 62, 64, aligned sleeves or hubs 102, 104, first and second clutch assemblies 66, 68, and first and second output members 70, 72. The speed and torque in each of the ranges initially set by gear ratios of the planetary arrangement 44 and mechanical dual clutch transmission 32 can be continuously varied within a given gear range by varying the output speed of the hydrostatic transmission 30. Thus, the mechanical dual clutch transmission 32 allows multiple selectable gear ranges that allow a wide range of speed and torque operation, while the continuously variable ability of hydromechanical transmission 26 through output from hydrostatic transmission 30 through the planetary arrangement 44 allows continuously variable speed and torque control within a given gear range. This allows for application of hydromechanical output power through a continuously variable speed and torque range to a load, such as one or more driving wheels of a vehicle, or tracks of an earth-working machine.

The planetary arrangement 44 includes first and second axially aligned planetary gear sets 74, 76, each first or second axially aligned planetary gear set 74, 76 including a sun gear 78, a carrier 56, and a ring gear 80, as is customary. The first and second axially aligned planetary gear sets 74, 76 impart rotation to a planetary output shaft assembly 82, which includes first and second planetary outputs in the form of an internal shaft 84 and an aligned sleeve 86, respectively. The aligned sleeve 86 may be, for example, a hollow member or hub, supported by the internal shaft 84. The output to the internal shaft 84 and sleeve 86 is dependent upon the arrangement and connections of the components of the first and second axially aligned planetary gear sets 74, 76. In the illustrated embodiment, the sleeve 86 outputs from the carrier 56 of the second planetary gear set 76 through a first planetary output gear 90. The internal shaft 84 connects to and outputs from the sun gears 78 of the first and second axially aligned planetary gear sets 74, 76 through a second planetary output gear 92 and through an auxiliary drive gear 94. The first and second planetary output gears 90, 92 are fixed to the planetary output shaft assembly 82, while the auxiliary drive gear 94 rotates thereon, but can be selectively fixed to the internal shaft 84 by engaging the third synchronizer 64.

In the illustrated embodiment, the first and second output members 70, 72, the first and second aligned sleeves or hubs 102, 104, and the final output member 58 are positioned parallel to the input member 36, the planetary arrangement 44, and the planetary output shaft assembly 82. As is customary, the input member 36, planetary output shaft assembly 82, first and second output members 70, 72, first and second hubs 102, 104, and final output member 58 are supported within a transmission housing (not shown) and rotate about bearings, or the like, (not shown) held within the housing.

The output from the planetary output shaft assembly 82 is transmitted by way of a plurality of gears, synchronizers, hubs, and clutches (explained in turn below) to one or the other of the first and second output members 70, 72, and on to the final output member 58. The first and second output members 70, 72 are in the form of rotatably mounted shafts to which first and second output shaft gears 96, 98 are fixedly mounted, respectively. The first and second output shaft gears 96, 98 are mounted to mesh with a final drive gear 100, which, in turn, is fixedly mounted to the final output member 58. In this way, rotation from the first and second output members 70, 72 is imparted to the final output member 58 by way of first and second output shaft gears 96, 98, respectively, and the final drive gear 100.

First and second aligned sleeves or hubs 102, 104 are supported by the internal first and second output members 70, 72, respectively. In order to couple output from the first and second hubs 102, 104 to the first and second output members 70, 72, respectively, first and second clutch assemblies 66, 68 are provided. The first and second clutch assemblies 66, 68 include first and second sets of rotatable discs 106, 108, which are fixed to the hubs 102, 104, respectively. The first and second clutch assemblies 66, 68 further include first and second sets of engaging discs 110, 112, which are fixed to the first and second output members 70, 72, respectively. In this way, when the first clutch assembly 66 is activated, that is, the first set of engaging discs 110 is engaged with or "clutches" the first set of rotatable discs 106, the first hub 102 rotates with the first output member 70. Similarly, when the second clutch assembly 68 is activated, that is, the second set of engaging discs 112 is engaged with or "clutches" the second set of rotatable discs 108, the second hub 104 rotates with the second output member 72. In one embodiment, the clutch assemblies 66, 68 are known hydraulically-engaged and spring-disengaged rotating frictional clutch assemblies which may be selectively activated to connect rotary motion from a given gear to one of the first or second output members 70, 72, i.e., connecting the given gear to the final output member 58.

Rotation from the planetary output shaft assembly 82 is output to the first or second hubs 102, 104, by way of a plurality of gears 90, 92, 114, 116, 120, 122 that are synchronized to the first or second hub 102, 104 by first or second synchronizers 60, 62, or by way of an auxiliary drive gear 94 that rotatably connects with first hub 102 through an auxiliary output gear 128 and is synchronized to the internal shaft 84 by the third synchronizer 64. The hubs 102 or 104 can be coupled to the first or second output member 70, 72 by activation of the first or second clutch assembly 66, 68. The first and second synchronizers 60, 62 are fixed to first and second hubs 102, 104, respectively, and rotate about the corresponding first or second output member 70, 72. The first and second synchronizers 60, 62 are three-position synchronizers adapted to move from a neutral position to either of two engaged positions, dependent on a preferred speed and direction. The third synchronizer 64 in this embodiment is a two-position synchronizer that is fixed to the internal shaft 84 of the planetary output shaft assembly 82, permanently, or through a coupling such as a spline, and moves from a neutral position to an engaged position.

The first planetary output gear 90 meshes with a first low-speed reduction gear 114, which, in turn, meshes with a second low-speed reduction gear 116. The first low-speed reduction gear 114 is axially aligned with and disposed to rotate about the first output member 70. First and second low-speed reduction gears 114, 116 are axially aligned with and supported on roller bearings 124, 126 on the first and second output members 70, 72, respectively, such that they may freely rotate about the first and second output members 70, 72 while disengaged.

The first low-speed reduction gear 114 may be selectively synchronized with the first hub 102 by way of the first synchronizer 60. The first hub 102 may in turn be coupled to the first output member 70 by activation of the first clutch assembly 66, to couple the output of the sleeve 86 of the planetary output shaft assembly 82 to the final output member 58 by way of the first output member 70. This would place the continuously variable transmission 20 in a low forward gear range (not specifically illustrated). We note that, when the transmission 20 is in the low forward gear range, the second clutch assembly 68 is not activated and the second synchronizer 62 may either be neutralized, or engaged to couple either of the second low-speed reduction gear 116 or the second high speed reduction gear 122 to the second hub 104, depending on the proximity to adjacent gear ranges.

Similarly, the second low-speed reduction gear 116 is axially aligned with and disposed to rotate about the second output member 72. The second low-speed reduction gear 116 may be selectively synchronized with the second hub 104 by way of the second synchronizer 62. The second hub 104 may in turn be coupled to the second output member 72 by activation of the second clutch assembly 68, to couple the output of the sleeve 86 of the planetary output shaft assembly 82 to the final output member 58 by way of the second output member 72. This would place the continuously variable transmission 26 in a low reverse gear range (not specifically illustrated). We note that, when the transmission 20 is in the low reverse gear range, the first clutch assembly 66 is not activated, and the first synchronizer 60 can either be neutralized, or engaged to couple either of the first low-speed reduction gear 114 or the first high-speed reduction gear 120 to the first hub 102, depending on the proximity to adjacent gear ranges.

The output from the internal shaft 84 of the planetary output shaft assembly 82 is output to the first or second hub 102, 104 by way of a plurality of gears 92, 120, 122 that are synchronized to the first or second hub 102, 104 by first or second synchronizers 60, 62, or the output from the internal shaft 84 may be output to the first hub 102 by way of a auxiliary drive gear 94, which meshes with auxiliary output gear 128 fixed to the first hub 102 and synchronized to the internal shaft 84 by the third synchronizer 64. Hub 102 or 104 can be coupled to the first or second output member 70, 72 respectively, by activation of the first or second clutch assembly 66, 68. As explained above, the second planetary output gear 92 is fixed to the internal shaft 84 of the planetary output shaft assembly 82. The second planetary output gear 92 intermeshes the second high-speed reduction gear 122, which drives the first high-speed reduction gear 120. Accordingly, as the second planetary output gear 92 rotates, the first and second high-speed reduction gears 120, 122 also rotate.

The first high-speed reduction gear 120 may be selectively synchronized with the first hub 102 by way of the first synchronizer 60. This synchronization rotationally couples the output from the internal shaft 84 of the planetary output shaft assembly 82 to the first hub 102 by way of the second planetary output gear 92, the second high-speed reduction gear 122 and the first high-speed reduction gear 120. The first hub 102 may in turn be coupled to the first output member 70 by activation of the first clutch assembly 66, to couple the output of the internal shaft 84 of the planetary output shaft assembly 82 to the final output member 58 by way of the first output member 70. This would place the continuously variable transmission 20 in a high reverse gear range (not specifically illustrated). We note that, when the transmission 20 is in the high reverse gear range, the second clutch assembly 68 is not activated, and the second synchronizer 62 can be left engaged to couple the second low-speed reduction gear 116 to the second hub 104, or neutralized.

Figure 2:
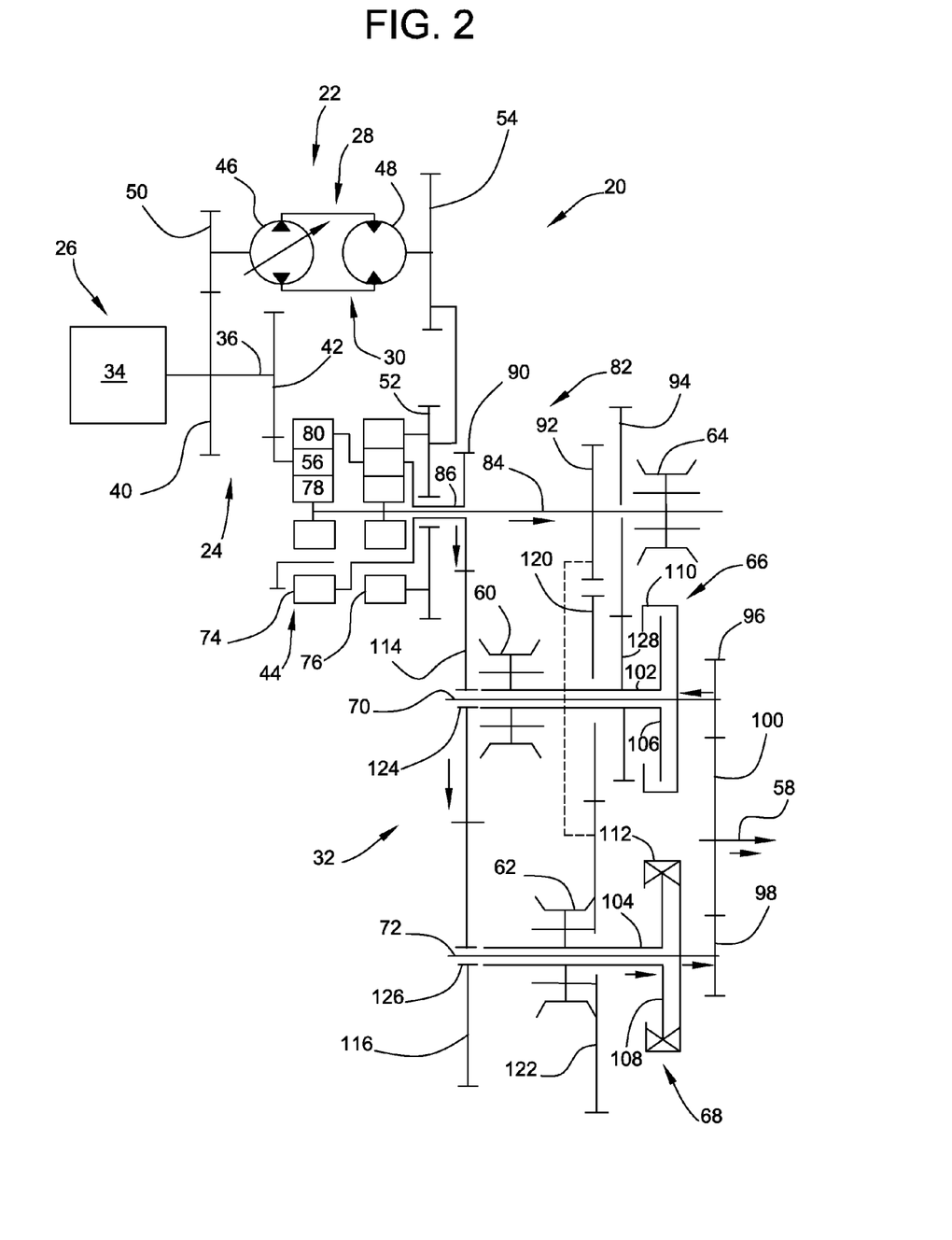
FIG. 2 illustrates a schematic view of a hydromechanical dual clutch transmission in a high-forward gear range.

Similarly, the second high-speed reduction gear 122 may be selectively synchronized with the second hub 104 by way of the second synchronizer 62 to rotationally couple the output from the internal shaft 84 of the planetary output shaft assembly 82 to the second hub 104 by way of the second planetary output gear 92 and the second high-speed reduction gear 122. The second hub 104 may in turn be coupled to the second output member 72 by activation of the second clutch assembly 68, to couple the output of the internal shaft 84 of the planetary output shaft assembly 82 to the final output member 58 by way of the second output member 72 to place the continuously variable transmission 20 in a high forward gear range, such as is illustrated in FIG. 2. We note that, when the transmission 20 is in the high forward gear range, the first clutch assembly 66 is not activated, and the first synchronizer 60 can either be neutralized or engaged to couple the first low-speed reduction gear 114 to the first hub 102.

Figure 7:
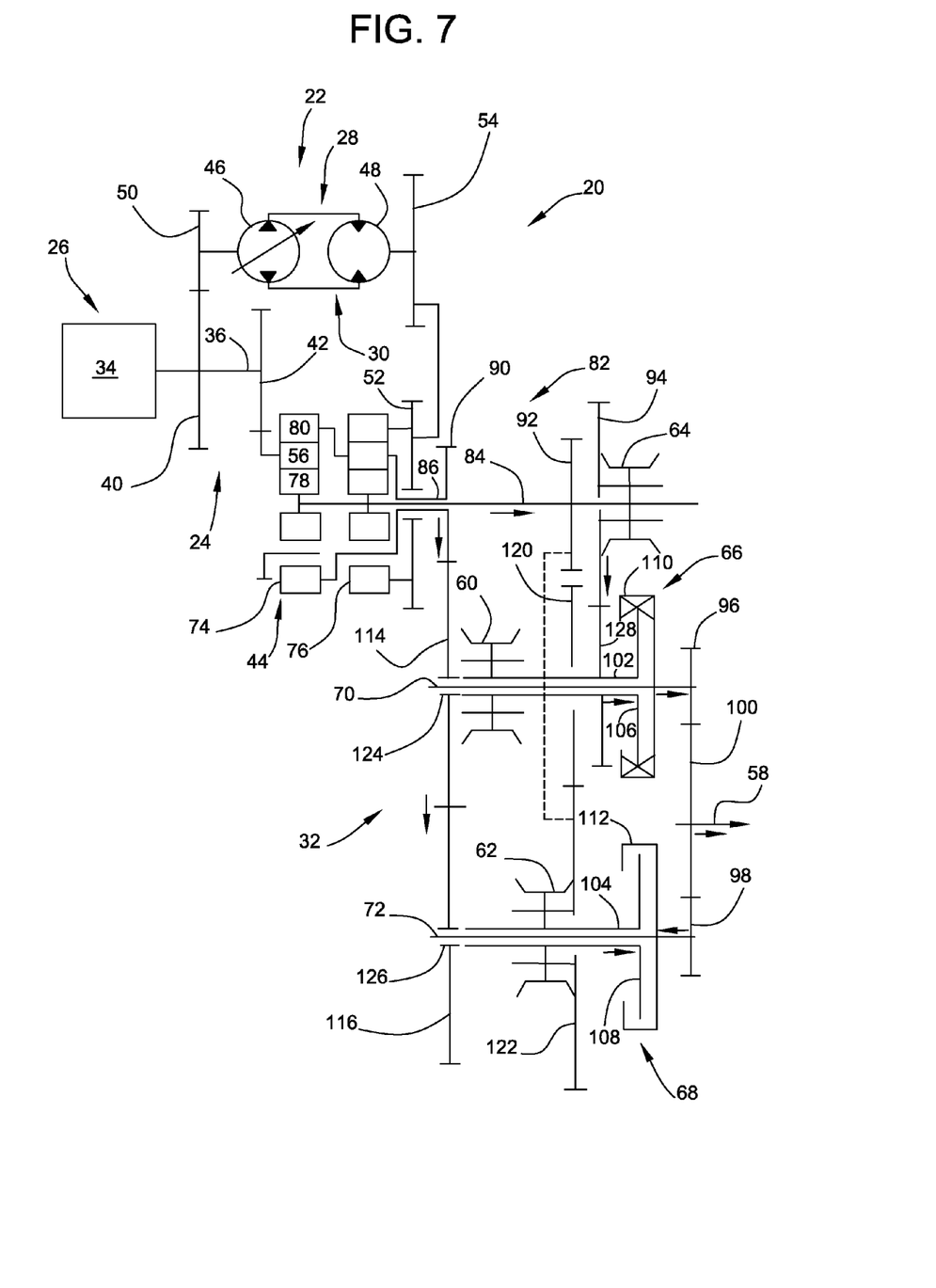
FIG. 7 illustrates a schematic view of a dual clutch hydromechanical transmission in an auxiliary forward gear range.

Output from the internal shaft 84 of the planetary output shaft assembly 82 may selectively be rotationally coupled to the final output member 58 by way of the auxiliary drive gear 94. The auxiliary drive gear 94, which is disposed to rotate about the internal shaft 84, intermeshes with an auxiliary output gear 128, which is fixedly mounted to the first hub 102. In this way, when the third synchronizer 64, which is fixedly mounted to the internal shaft 84, is engaged with the auxiliary drive gear 94, the rotation from the internal shaft 84 is output to the first hub 102. The first hub 102 may in turn be coupled to the first output member 70 by activation of the first clutch assembly 66, to couple the output of the internal shaft 84 of the planetary output shaft assembly 82 to the final output member 58 by way of the first output member 70 to place the continuously variable transmission 20 in an auxiliary forward gear range, such as is illustrated in FIG. 7. We note that, when the transmission 20 is in the auxiliary forward gear range, the second clutch assembly 68 is not activated, the second synchronizer 62 may either be neutralized or left engaged to couple the second high-speed reduction gear 122 to the second hub 104, and the first synchronizer 60 must be neutralized.

An embodiment of a method of synchronizing in a split torque, continuously variable transmission according to the disclosure is illustrated in FIGS. 2-7. According to the method, with the transmission 20 in given gear range that provides output to the final output member 58, a target gear for synchronization in an alternate gear range is rotatably coupled to the final output member 58 on a temporary basis. This temporary coupling brings the target gear to a speed that facilitates synchronization during the gear range change. A specific embodiment of the method is illustrated with regard to a change from a high forward gear range (illustrated in FIG. 2) to an auxiliary forward gear range (illustrated in FIG. 7), FIGS. 3-6 illustrating the transition between the high forward gear range and the auxiliary forward gear range. Accordingly, in the illustrated embodiment, the target gear is auxiliary drive gear 94. It will be appreciated by those of skill in the art, however, that the method may be applicable to other changes in gear range, as well as in other transmissions. By way of example only, the method may be utilized in an alternate transmission for a change from low to high reverse, or from a high reverse to an auxiliary reverse range (not illustrated).

Turning now to FIG. 2, in the high forward gear range, the first synchronizer 60 is neutralized and the first clutch assembly 66 is not activated, while the second synchronizer 62 is engaged with a second rotatable member, here, the second high speed reduction gear 122. With the second clutch assembly 68 activated, rotation from the internal shaft 84 is transmitted to the second planetary output gear 92 fixed thereto. The rotation of the second planetary output gear 92 is transmitted to the second high-speed reduction gear 122, which is synchronized to the second hub 104 by way of the second synchronizer 62. The activation of the second clutch assembly 68 couples the rotational motion of the second hub 104 with the second output member 72, which transmits rotational motion to the final output member 58 by way of the second output shaft gear 98 and the final drive gear 100.

Figure 3:
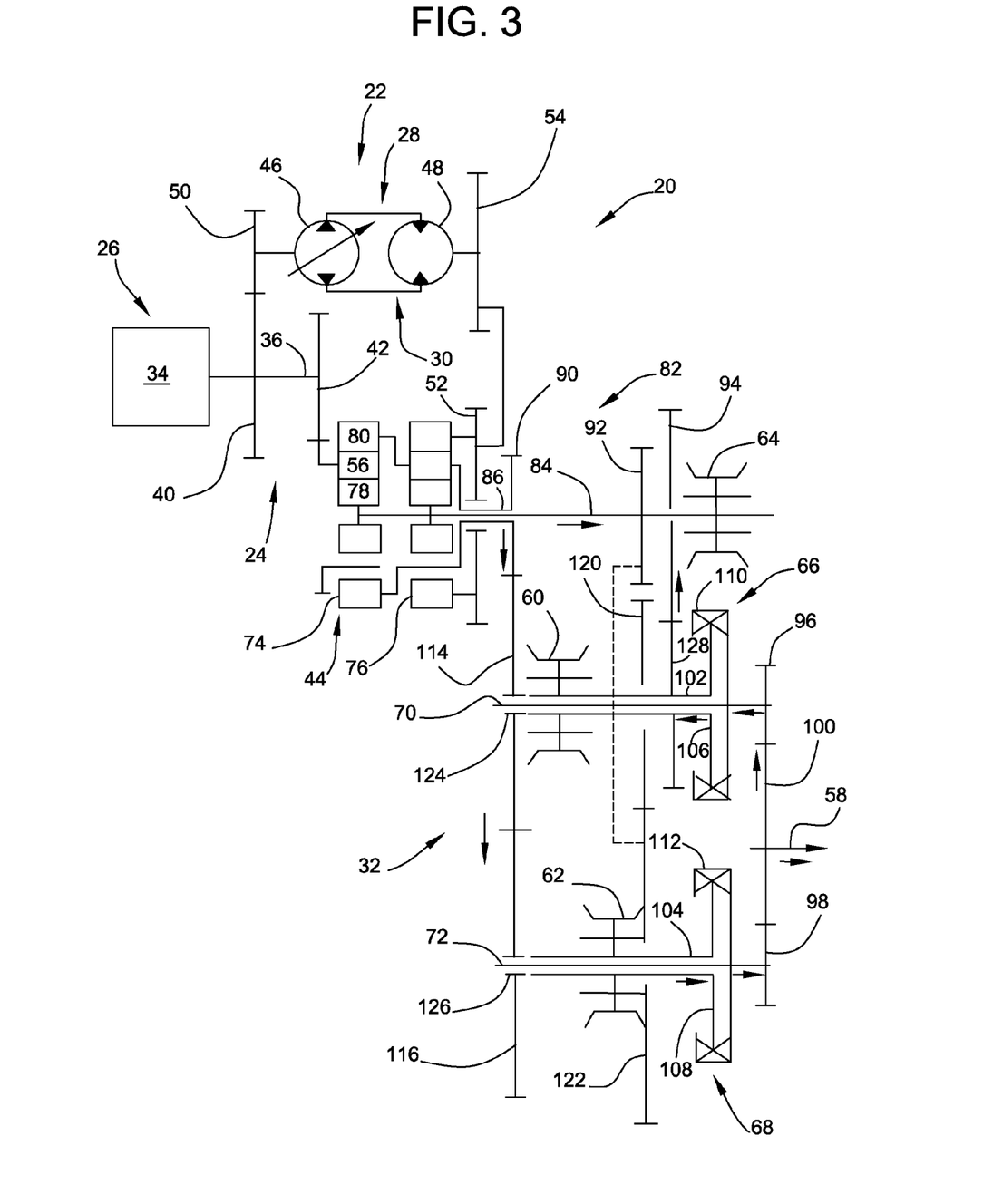
FIGS. 3 through 6 illustrate schematic views of a dual clutch hydromechanical transmission performing a synchronization and a gear range change from a high-forward to an auxiliary forward gear range according to the disclosed method.

When the transmission control determines that a range change utilizing the auxiliary drive gear 94 may likely be required, with the second synchronizer 62 remaining engaged and the second clutch assembly 68 activated, the first clutch assembly 66 also is activated to connect a first rotatable member, here, the first hub 102 with the affixed auxiliary output gear 128 meshed to the auxiliary drive gear 94, as shown in FIG. 3. This activation of the first clutch assembly 66 causes the auxiliary drive gear 94 to rotate at a speed that is proportional to the speed of the final output member 58, depending upon the relative sizes of the final drive gear 100, the first output shaft gear 96, the auxiliary output gear 128, and the auxiliary drive gear 94.

The first clutch assembly 66 remains activated until a shift trigger point is reached. The shift trigger point may be based upon any appropriate mechanism. For example, the shift trigger point may be based upon a set period of time deemed adequate to impart desired speed to the auxiliary drive gear 94, or it may be based upon a predetermined rotational speed or transmission ratio, or an operator's input requesting an upshift.

In an embodiment, the rotational speed of the final output member 58 for the high forward and aux forward gear ranges overlap somewhat for a range of machine output speed, also depending upon input speed from the engine 34. As a result, a desirable gear range may be determined for a given input speed from the engine 34 and output speed of the final output member 58. The range may be based upon a combination of inputs, including, for example, such operator inputs as direction switch, virtual gear selection, and right and left pedal positions. A calculated transmission ratio (the ratio of overall output speed of the final output member 58 to input speed from the engine 34) may be utilized as the shift trigger point within the range that can be satisfied by both high forward gear range and auxiliary forward gear range. It may be determined that it would be advantageous to upshift into the auxiliary range above the identified ratio.

Figure 4:
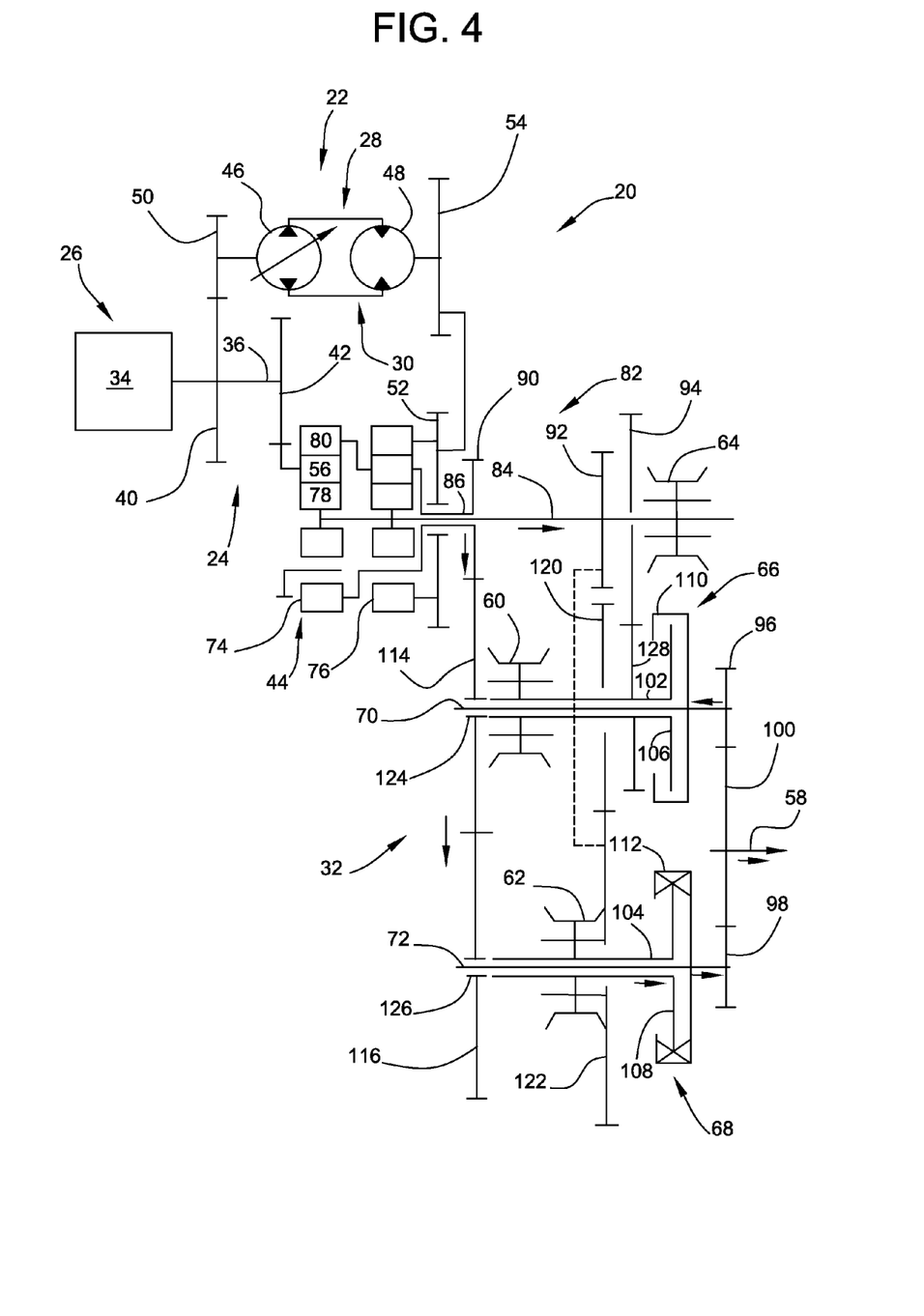
Figure 5:
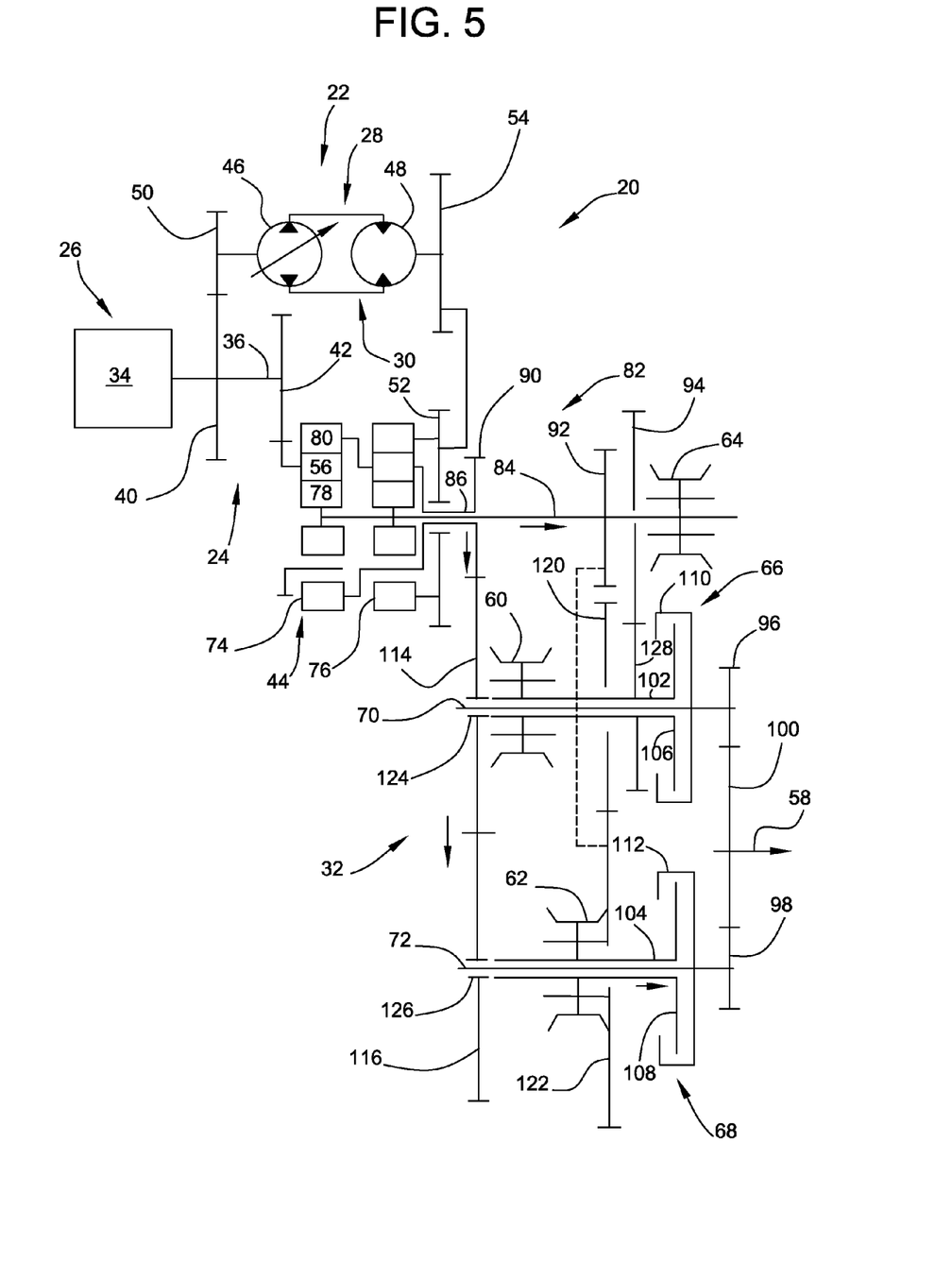
Figure 6:
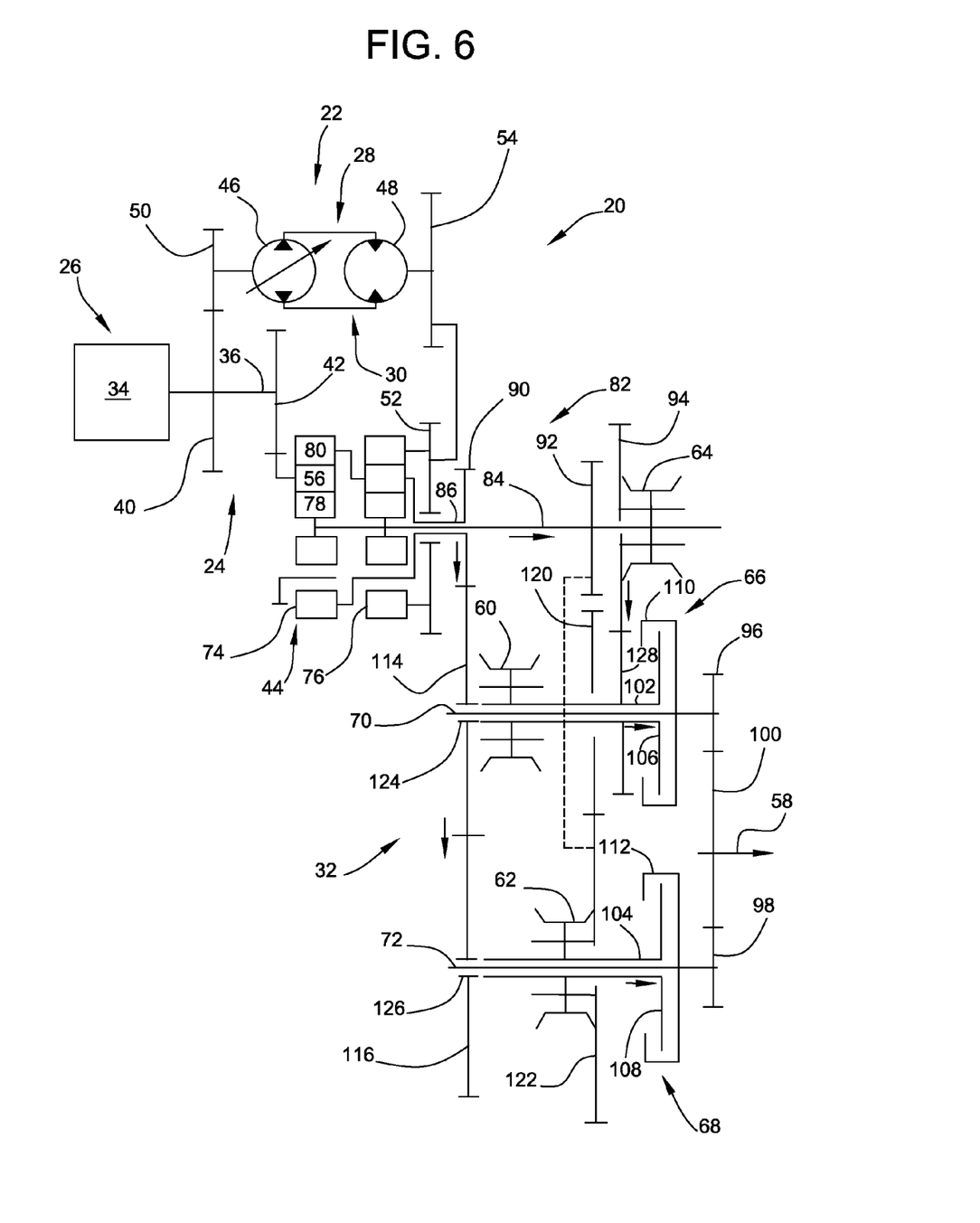

Continuing to FIG. 4, once the shift trigger point is reached, the first clutch assembly 66 is deactivated to uncouple the first hub 102 and the associated auxiliary output gear 128 and auxiliary drive gear 94 from the first output member 70. As shown in FIG. 5, the second clutch assembly 68 also is deactivated to uncouple the second hub 104 and associated internal shaft 84 connected through the second high-speed reduction gear 122 from the second output member 72. With both the first and second clutches 66, 68 deactivated, the output speed of the variator 28 motor 48 is controllably changed, affecting variator output gear 54 meshed to the second planetary input member 52 to drive the planetary ring gear 80 of the second axially aligned planetary gear set 76, which adjusts the speed of the internal shaft 84 to reduce relative speed between the internal shaft 84 and the auxiliary drive gear 94, which is meshed through auxiliary output gear 128 with the first hub 102. The transmission input speed, that is, the speed of the engine 34, may likewise be modified during this event to facilitate quicker synchronization. During this variator 28 output speed and engine 34 speed adjustment event, and based on a relative speed trigger point, the third synchronizer 64 is moved into engagement with the rotating auxiliary drive gear 94 to couple the auxiliary drive gear 94 to the internal shaft 84 of the planetary output shaft assembly 82, as shown in FIG. 6. As a result, the auxiliary drive gear 94, the auxiliary output gear 128, and the first hub 102 rotate with the internal shaft 84.

Figure 8:
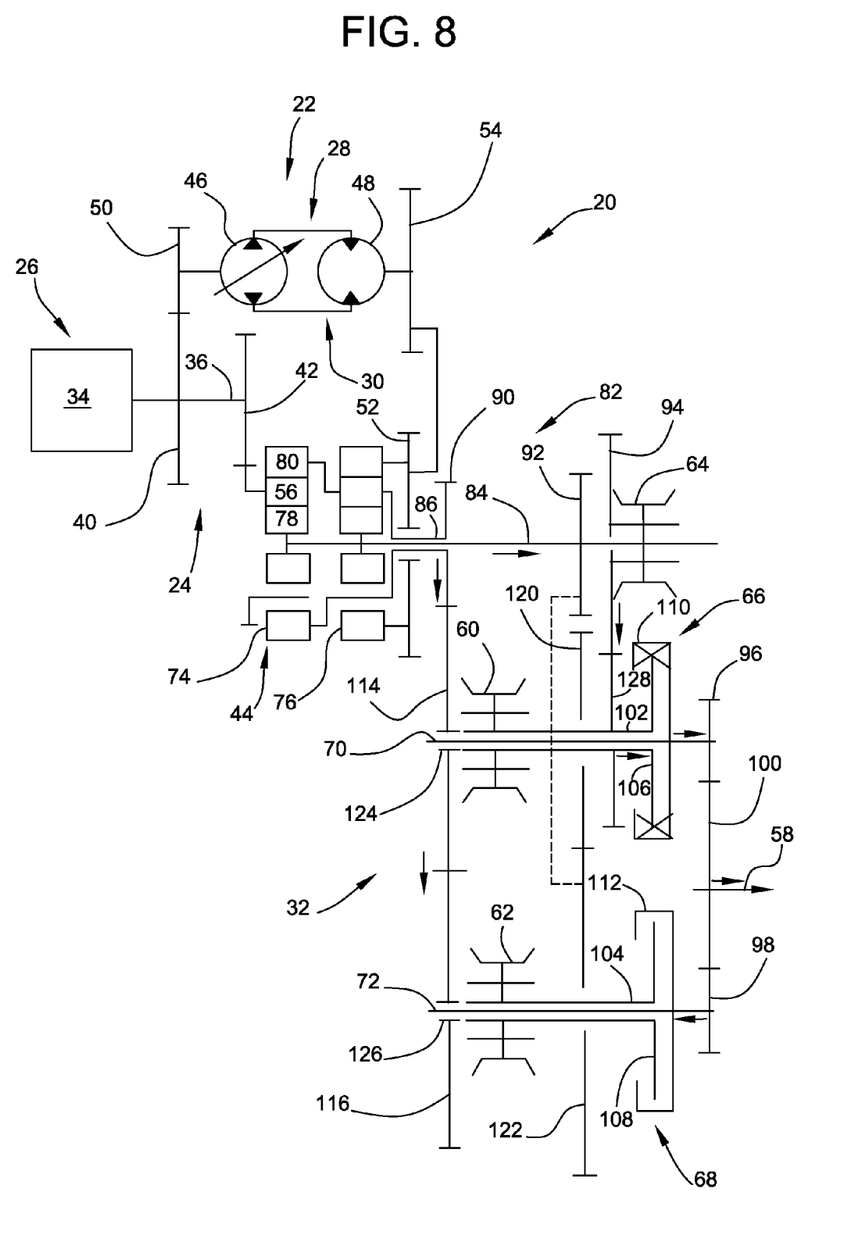
FIG. 8 illustrates a schematic view of a dual clutch hydromechanical transmission in an alternate auxiliary forward gear range.

With the second clutch assembly 68 remaining deactivated and the variator 28 output speed and engine 34 speed controlled to reduce the relative speed of the synchronized hub 102 with the first output member 70, the first clutch assembly 66 is re-activated to couple the rotating first hub 102 to the first output member 70, as shown in FIG. 7. Then, the second synchronizer 62 can be neutralized, if desired, as shown in FIG. 8. In this way, activation of the first clutch assembly 66 couples the combined power of the first and second power source paths 22, 24 conveyed through the internal shaft 84 of the planetary output shaft assembly 82 to the auxiliary drive gear 94 synchronized to internal shaft 84 using third synchronizer 64, the auxiliary output gear 128, and the first hub 102 to the final output member 58 by way of the first output member 70, the first output shaft gear 96, and the final drive gear 100.

INDUSTRIAL APPLICABILITY

The present disclosure is applicable to continuously variable transmissions 20 utilizing first and second power source paths 22, 24 to provide multiple outputs through a planetary arrangement and a planetary output shaft assembly 82 to a mechanical transmission, such as identified by reference number 32. For example, the disclosure is applicable to hydromechanical transmissions, and transmissions utilizing a hydrostatic transmission 30 or alternate arrangement as the first power source path, such as, for example, an electric motor driving an electro-mechanical transmission (not shown), an electric battery and a motor (not shown), a hydraulic accumulator and a motor (not shown), an electric generator and electric motor (not shown), or other device capable of providing input power.

The disclosed method may be utilized to minimize the relative speed of synchronizing components prior to and during gear range changes. The disclosed method utilizes the clutch assembly from the non-power-transmitting output member to link selected components, including a target gear, to the final output member 58 prior to start of synchronizer engagement, thus reducing the differences in rotational speed between the synchronizer 64 and the target gear, that is, the auxiliary drive gear 94 during engagement.

The disclosed method may provide faster and/or more consistent synchronization in moving from one gear range to another as well as facilitate faster range changes with less torque interruption in what would otherwise be a non-synchronous range shift.

The disclosed method may result in less wear and tear on the components utilized in synchronization, possibly resulting in a longer lifespan.

It will be appreciated that the foregoing description provides examples of the disclosed system and technique. However, it is contemplated that other implementations of the disclosure may differ in detail from the foregoing examples. The use of modifiers such as first, second and third are provided merely for convenience and are not intended to indicate any requirement that all such elements be provided or that they be provided in a specific order. By way of example only, the inclusion of a "first," a "second," and a "third" of any element is not intended to indicate that a "first" such element be provided if a "second" and a "third" such element are provided.

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A method of selectively engaging one of a synchronizer and
   activating one of a clutch assembly of a continuously variable transmission, the transmission including an output shaft assembly having a plurality of output members, first and second clutch assemblies, second and third synchronizers, and first and second rotatable members, the method comprising the steps of:
   providing first and second power source paths;
   outputting a combined power of the first and second power source paths through at least one of the output members of the output shaft assembly;
   engaging the second synchronizer to synchronize a speed of the second rotatable member to one of the output members of the output shaft assembly;

activating the second clutch assembly to connect the synchronized second rotatable member to a final output member to output a second speed having a second gear ratio;

activating the first clutch assembly to connect the first rotatable member to the final output member to provide a rotational speed to the first rotatable member;

maintaining connection of the first rotatable member with the final output member until a shift trigger point is reached;

deactivating the first clutch assembly;

deactivating the second clutch assembly;

engaging the third synchronizer to synchronize the first rotatable member to the one of the output members of the output shaft assembly;

activating the first clutch assembly to connect the synchronized first rotatable member to the final output member to output a third speed having a third gear ratio.

2. The method according to claim 1, further comprising a step of neutralizing the second synchronizer.

3. The method according to claim 1, wherein the first rotatable member includes a first hub rotatably mounted to a first output member, the second rotatable member includes a second hub rotatably mounted to a second output member, and the first and second output members are rotatably coupled to the final output member.

4. The method according to claim 1 wherein the first power source path is an internal combustion engine, and the second power source path is a pump and motor.

5. The method according to claim 1 wherein the first and second power source paths are coupled to a planetary gearing arrangement to output the combined power to at least a portion of the output shaft assembly.

6. The method according to claim 1 wherein the first rotatable member includes at least one auxiliary gear.

7. The method according to claim 6 wherein the at least one auxiliary gear includes an auxiliary drive gear and an auxiliary output gear.

8. The method according to claim 1 wherein the step of activating the second clutch assembly to connect the synchronized second rotatable member to a final output member places the transmission in a high forward gear range.

9. The method according to claim 8 wherein the step of activating the first clutch assembly to connect the synchronized first rotatable member to the final output member places the transmission in an auxiliary gear range.

10. The method according to claim 1, further including a step of adjusting a speed of at least one of the first and second power source paths to minimize a difference in speeds between the first rotatable member and the one of the output members of the output shaft assembly prior to the step of engaging the third synchronizer.

11. The method according to claim 1 wherein the shift trigger point is based upon at least one of a calculated transmission ratio or operator inducement.

12. A method of selectively engaging one of a synchronizer and activating one of a clutch assembly of a hydromechanical transmission, comprising the steps of:

providing first and second power source paths;

outputting a combined power of the first and second power source paths through an output shaft assembly including a plurality of output members;

engaging a first synchronizer to synchronize a speed of a first rotatable member to one of the plurality of output members of the output shaft assembly;

activating a first clutch assembly to connect the synchronized first rotatable member to a final output member to place the transmission in a forward gear and output a first speed having a first gear ratio;

engaging a second synchronizer to synchronize the speed of a second rotatable member to another of the plurality of output members of the output shaft assembly;

deactivating the first clutch assembly;

activating a second clutch assembly to connect the synchronized second rotatable member to the final output member to place the transmission in a high forward gear range and output a second speed having a second gear ratio;

neutralizing the first synchronizer;

activating the first clutch assembly to connect the first rotatable member to the final output member to provide a rotational speed to the first rotatable member;

maintaining connection of the first rotatable member with the final output member until a shift trigger point is reached;

deactivating the first clutch assembly;

deactivating the second clutch assembly;

adjusting an output speed of at least one of the first or second power source paths to minimize a difference in speed between the another of the plurality of output members of the output shaft assembly and the first rotatable member;

engaging a third synchronizer to synchronize the speed of the first rotatable member with the another of the plurality of output members of the output shaft assembly;

activating the first clutch assembly to connect the first rotatable member synchronized using the third synchronizer to the final output member to place the transmission in an auxiliary gear range to output a third speed having a third gear ratio.

13. A method of selectively engaging one of a synchronizer and activating one of a clutch assembly of a hydromechanical transmission, comprising the steps of:

providing first and second power source paths;

outputting a combined power of the first and second power source paths through a output shaft assembly having a plurality of output members;

engaging a first synchronizer to synchronize a first rotatable member with a speed of one of the multiple output members of the output shaft assembly;

activating a first clutch assembly to connect the synchronized first rotatable member to a final output member to output a first speed having a first gear ratio;

engaging a second synchronizer to synchronize a second rotatable member with the speed of another of the multiple output members of the output shaft assembly;

deactivating the first clutch assembly;

activating a second clutch assembly to connect the synchronized second rotatable member to the final output member to output a second speed having a second gear ratio;

neutralizing the first synchronizer;

activating the first clutch assembly to connect the first rotatable member to the final output member to provide a rotational speed to the first rotatable member;

maintaining connection of the first rotatable member with the final output member until a shift trigger point is reached;

deactivating the first clutch assembly;

deactivating the second clutch assembly;

engaging a third synchronizer to synchronize the first rotatable member with the another of the multiple output members of the output shaft assembly; and activating the first clutch assembly to connect the first rotatable member synchronized using the third synchronizer to the final output member to output a third speed having a third gear ratio.

14. The method according to claim 13, further comprising the step of neutralizing the second synchronizer.

15. The method according to claim 13, wherein the first rotatable member is a first hub rotatably mounted to a first output member, and the second rotatable member is a second hub rotatably mounted to a second output member, the first and second output members being rotatably coupled to the final output member.

16. The method according to claim 15, wherein the third synchronizer synchronizes with a rotatable gear coupled to the first rotatable member.

17. The method according to claim 13, wherein the first power source path includes an internal combustion engine, and the second power source path is a pump and motor.

18. The method according to claim 13 wherein the first and second power source paths are coupled to a planetary gearing arrangement to output the combined power through the output shaft assembly.

19. The method according to claim 13 wherein the step of activating the first clutch assembly to connect the rotatable member synchronized using the first synchronizer to a final output member places the transmission in a forward gear range, the step of activating the second clutch assembly to connect the synchronized second rotatable member to the final output member places the transmission in a high forward gear range, and the step of activating the first clutch assembly to connect the first rotatable member synchronized using the third synchronizer to the final output member places the transmission in an auxiliary forward gear range.

20. The method according to claim 19, further including a step of adjusting speed of at least one of the first and second power source paths to minimize a difference in speeds of the first rotatable member to a speed of the combined power output prior to the step of engaging the third synchronizer.

\* \* \* \* \*